(12) United States Patent
Derrien et al.

(10) Patent No.: US 8,881,937 B2
(45) Date of Patent: Nov. 11, 2014

(54) MOULD FOR BLOWING VESSELS WITH REINFORCED BOTTOM

(75) Inventors: Mikael Derrien, Octeville sur Mer (FR); Michel Boukobza, Octeville sur Mer (FR)

(73) Assignee: Sidel Participations, Octeville sur Mer (FR)

( * ) Notice: Subject to any disclaimer, the term of this patent is extended or adjusted under 35 U.S.C. 154(b) by 479 days.

(21) Appl. No.: 13/129,990

(22) PCT Filed: Nov. 17, 2009

(86) PCT No.: PCT/FR2009/001316
§ 371 (c)(1),
(2), (4) Date: Sep. 2, 2011

(87) PCT Pub. No.: WO2010/058098
PCT Pub. Date: May 27, 2010

(65) Prior Publication Data
US 2012/0031916 A1    Feb. 9, 2012

(30) Foreign Application Priority Data

Nov. 19, 2008 (FR) ..................................... 08 06473

(51) Int. Cl.
| | |
|---|---|
| *B29C 49/48* | (2006.01) |
| *B65D 1/02* | (2006.01) |
| *B29C 49/06* | (2006.01) |
| *B29C 49/12* | (2006.01) |

(52) U.S. Cl.
CPC ................ *B29C 49/48* (2013.01); *B29C 49/06* (2013.01); *B29C 2049/4892* (2013.01); *B29C 49/12* (2013.01); *B65D 1/0261* (2013.01)

USPC ............ 220/675; 264/534; 425/522; 425/525

(58) Field of Classification Search
USPC ............ 425/522, 525, 529; 264/534; 220/675
See application file for complete search history.

(56) References Cited

U.S. PATENT DOCUMENTS

| | | | | |
|---|---|---|---|---|
| 4,035,455 A | * | 7/1977 | Rosenkranz et al. | ......... 264/534 |
| 4,177,239 A | * | 12/1979 | Gittner et al. | ................. 264/532 |

(Continued)

FOREIGN PATENT DOCUMENTS

| | | | |
|---|---|---|---|
| JP | 60106905 U | * | 7/1985 |
| JP | 2780367 B2 | * | 7/1998 |

OTHER PUBLICATIONS

Partial machine translation of JP 2780367 B2 dated Jul. 1998 obtained from the JPO website.*

*Primary Examiner* — Robert B Davis
(74) *Attorney, Agent, or Firm* — Sughrue Mion, PLLC

(57) ABSTRACT

Mold for manufacturing, by blowing blanks made of plastic material, containers having a body and a bottom and a wall defining a cavity around a principal axis of the mold and a lateral surface. The wall has, in a lower part, an opening defining a passage for a mold bottom, an upper surface that confers at least in part the shape to the bottom of the container, with said opening having an upper edge. The mold, in any plane containing the axis of the wall: the ratio between a transverse dimension of the upper edge of the opening and a transverse dimension of a lower end of the lateral surface of the wall is greater than 0.95, and the tangent to the lateral surface of the wall, at the lower end thereof, forms with the axis of the wall an angle equal to or less than 30°.

9 Claims, 14 Drawing Sheets

(56) References Cited

U.S. PATENT DOCUMENTS

| | | | |
|---|---|---|---|
| 4,769,206 A * | 9/1988 | Reymann et al. | 264/534 |
| 5,389,332 A * | 2/1995 | Amari et al. | 425/529 |
| 6,089,854 A * | 7/2000 | Outreman et al. | 425/526 |
| 6,277,321 B1 * | 8/2001 | Vailliencourt et al. | 264/529 |
| 6,635,217 B1 * | 10/2003 | Britton | 264/534 |
| 6,640,993 B2 * | 11/2003 | Nakamura et al. | 220/675 |
| 7,556,164 B2 * | 7/2009 | Tanaka et al. | 220/675 |
| 2006/0006133 A1 * | 1/2006 | Lisch et al. | 215/374 |

* cited by examiner

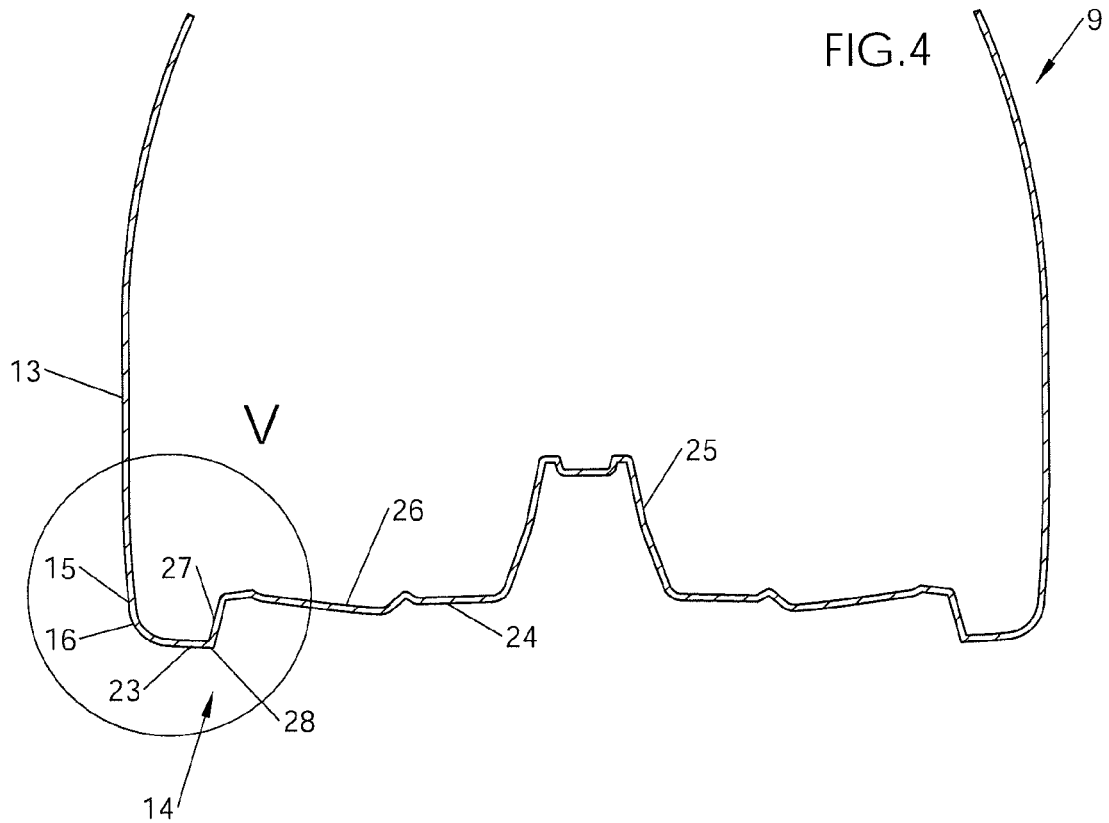
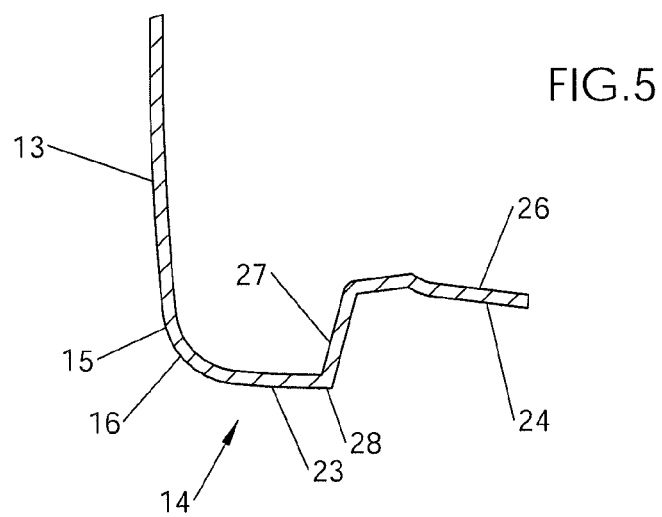

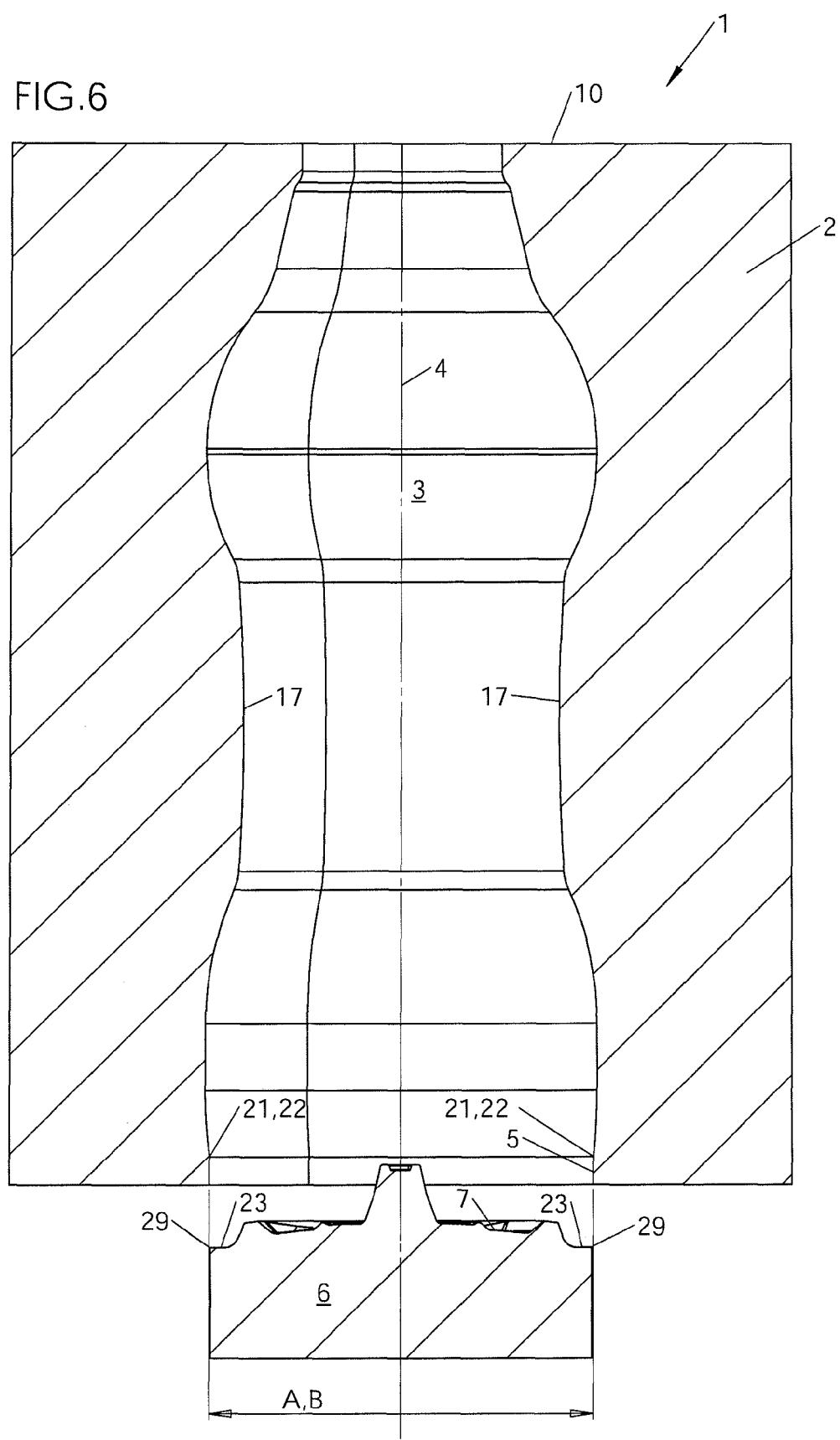

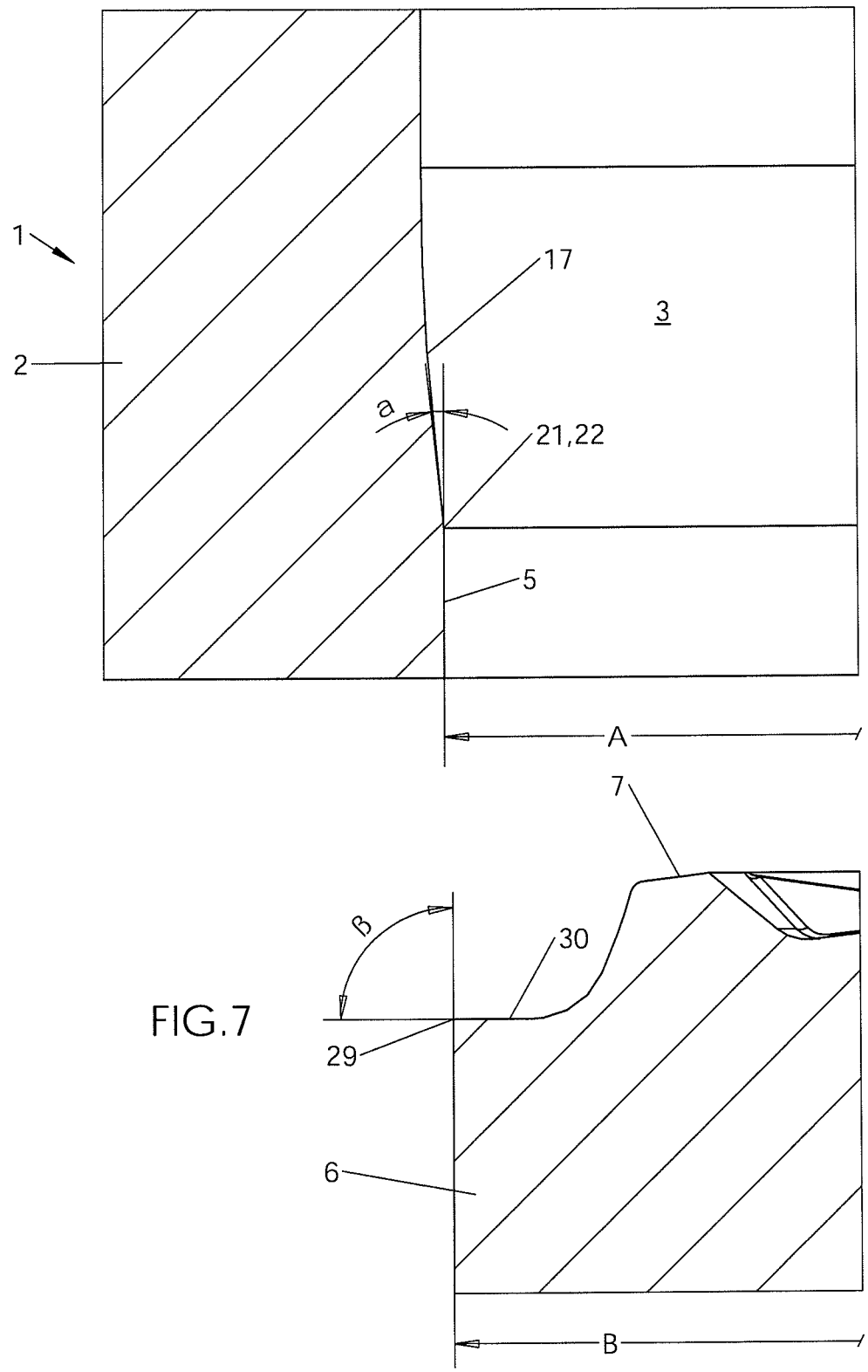

MOULD FOR BLOWING VESSELS WITH REINFORCED BOTTOM

The invention relates to the manufacture of containers, such as bottles or jars, obtained by blowing or stretch-blowing from blanks of thermoplastic material.

To manufacture a container using the blowing technique, a blank (a preform or an intermediate container having undergone a first blowing operation from a preformed) is first heated to a temperature exceeding the glass transition temperature of the material of which the blank is composed. The blank is inserted into a mold, and is then blown by injecting a gas (such as air) into it under high pressure (generally more than 30 bars).

The stretch-blowing technique consists, in addition to the blowing, of stretching the blank by means of a sliding rod in order to minimize the off-centering of the container and to make the distribution of the material as uniform as possible.

The mold comprises a wall defining a cavity intended to give the body of the container its shape. Said cavity is closed, at a lower end, by a mold bottom intended to give the bottom of the container its shape.

During blowing, the containers undergo a biaxial molecular orientation: axial on the one hand, parallel to the general axis of the mold; radial on the other hand, perpendicular to the axis of the mold. This biaxial orientation gives the containers a certain structural rigidity.

One of the principal goals currently sought by manufacturers is a decrease in the quantity of material used, in order to reduce the weight of the containers. To compensate for this lightening of the containers, it is necessary to increase their rigidity by artifacts related either to the manufacturing process, or to the design, the structural rigidity related to the biaxial orientation alone appearing to be insufficient. It is even the case that some specifications (particularly for hot-filling applications) recommend a reduction of weight and an increase of rigidity at the same time.

In the past, several solutions have been proposed to increase the structural rigidity of the containers.

A first solution, illustrated by French patent FR 2 595 294 (Sidel) and its American equivalent U.S. Pat. No. 4,836,971, consists of proceeding with the blowing of the container in two steps (and in two different molds): a first step, in which an intermediate container is formed that is of larger volume than the container to be obtained, then a second step during which the container is molded to its final dimensions. Given the technical difficulty of implementation and the relatively long cycle time (two to three times longer than for an ordinary procedure), this solution is not in wide use.

A second solution, illustrated by French patent FR 2 649 035 (Sidel) and its American equivalent U.S. Pat. No. 5,145,632, consists of heating the wall of the mold, which confers upon the container held in contact therewith an additional rigidity due to the increase in the rate of crystallinity (called thermofixation).

This is a proven solution. In fact, it is in widespread use in HR (Heat Resistant) applications in which the containers are intended to withstand hot filling, i.e. in practice at a temperature (on the order of 85° to 95° C.) greater than the glass transition temperature of the material of which the containers are made.

However, this solution has a number of disadvantages.

First, to the extent that it is necessary to keep the container in contact with the wall of the mold for a relatively long period with respect to the total duration of the cycle, at equivalent production capacity the manufacturing rate is always lower than for ordinary procedures. Because of this, thermofixation is not in general use but is generally limited only to HR applications, which, given the high margin products concerned (fruit juices, tea), justify the use of top-of-the-line containers.

Moreover, there is still a difficulty in giving the appropriate structural rigidity to the bottom of the container, which can be deformed not only under the effect of the hydrostatic pressure but also under the effect of the heat during hot filling. Indeed, it is nearly systematically observed, irrespective of the shape of the container, that the material is thicker at the bottom of the container than in its body. The reason for this is the rate of deformation (i.e. the ratio between the final surface area and the initial surface area) of the bottom is lower than that of the body. It is even noted that there are zones in the bottom that can be called amorphous (having a rate of crystallinity of less than about 20%) or quasi-amorphous (having a rate of crystallinity of between about 20% and 25%) that even thermofixation cannot absorb, unless industrially unacceptable cycle times are provided.

One technical solution that has been proposed is to increase the structural rigidity of the bottom by increasing its rate of deformation. According to this solution, which may or may not be combined with thermofixation, the container is first stretched beyond its final height before being completely blown to the correct height. To that end, the mold bottom is mounted axially movable with respect to the wall of the mold. First, the mold bottom is placed in the lower position and the container undergoes an axial deformation by stretching until the stretch rod reaches the bottom of the mold. The bottom of the mold is then raised to the upper position, and while the blowing continues, the container is pressed against the bottom of the mold. This technique, called boxing, makes it possible by stretching the bottom beyond its normal position to increase its rate of deformation and thus its crystallinity. Moreover, a decrease is noted in the thickness of the bottom, which makes it possible not only to consider decreasing the quantity of material, but also to improve thermofixation.

The boxing technique, illustrated in particular in European patent EP 1 069 983, is not without its own disadvantages. The principal difficulty is in synchronizing the ascension movement of the mold bottom with the blowing of the container. Indeed, although the stretching is under constant control by the positioning of the stretch rod, the blowing has its uncertainties due to the way in which the air bubble develops inside the blank. More specifically, although the general profile of development of the bubble is known, there may be variations from one container to another that affect this profile due to inequalities of distribution of material, as well as inequalities of distribution of temperature. Also, raising the mold bottom too soon can lead to a bottom that is not sufficiently stretched. On the other hand, raising it too late can cause an overflow of material onto the periphery of the mold bottom and a pinching of the bead thus created, between the wall of the mold and the bottom of the mold during the raising thereof. In this case as in the other, the container is improperly formed and must be rejected.

The inventors have had the following objectives, desiring to propose solutions to remedy the aforementioned disadvantages:
  to improve the mechanical strength of the containers, particularly during hot filling;
  or, at least to decrease the weight of containers having a mechanical strength that is at least equivalent.

To that end, the invention proposes a mold for manufacturing, by blowing blanks made of plastic material, containers having a body and a bottom. This mold comprises a wall defining a cavity around a principal axis of the mold and comprises a lateral surface intended to give the body of the container its shape. The said wall has, in a lower part, an opening defining a passage for a mold bottom, an upper surface of which is intended to confer, at least in part, its shape to the bottom of the container—a mold in which, in any plane containing the axis of the wall:

the ratio between a transverse dimension of an upper edge of the opening and a transverse dimension of the lower end of the lateral surface of the wall is greater than 0.95, and the tangent to the lateral surface of the wall, at the lower end thereof, forms an angle equal to or less than 30° with the axis of the wall.

According to a particular embodiment, the tangent to the lateral surface of the wall, at the lower end thereof, forms an angle equal to or less than 10° with the axis of the wall.

Moreover, the ratio between a transverse dimension of the upper edge of the opening and a transverse dimension of the lower end of the lateral surface of the wall can be greater than 1, the wall having no annular rim at its lower end.

As a variation, the wall has, around the opening, an annular rim having a radial upper surface, and the wall has no shoulder at the junction between the lateral surface and this radial upper surface.

The mold further comprises a mold bottom having an upper surface forming an impression for a container bottom, and the transverse dimension of which, measured at the edge of said upper surface and taking into account working clearance, is equal to the transverse dimension of the upper edge of the opening, said mold being mounted movably with respect to the wall between the lower position in which the mold bottom is separated from the opening, and an upper position in which the mold bottom blocks the opening.

According to another aspect, the invention proposes a container of plastic material comprising a body and a bottom having a predetermined transverse dimension, and having a shoulder at the junction between the body and the bottom, container in which the ratio of the radius of the shoulder to the transverse dimension of the bottom is less than about 1/50.

Thanks to these provisions, compared to an ordinary container this container has a broader and more rigid resting point (also called "positioning plane"). The result is better stability of the container in common use.

The radius of the shoulder is for example less than 1 mm, and in particular equal to about 0.5 mm.

Other objects and advantages of the invention will be seen from the following description with reference to the appended drawings in which:

FIG. 4 is a partial cross-sectional view showing a container produced by stretch-blowing in a mold as represented in FIGS. 1 to 3;

FIG. 5 is a partial cross-sectional view, in larger scale, of a detail shown in the inset V of the container of FIG. 4;

FIG. 6 is a cross-sectional view in elevation illustrating a mold according to the invention, shown in the lower position of the mold bottom, according to a first embodiment;

FIG. 7 is a partial cross-sectional view, in larger scale, of a detail of the mold of FIG. 6;

Figure 1:
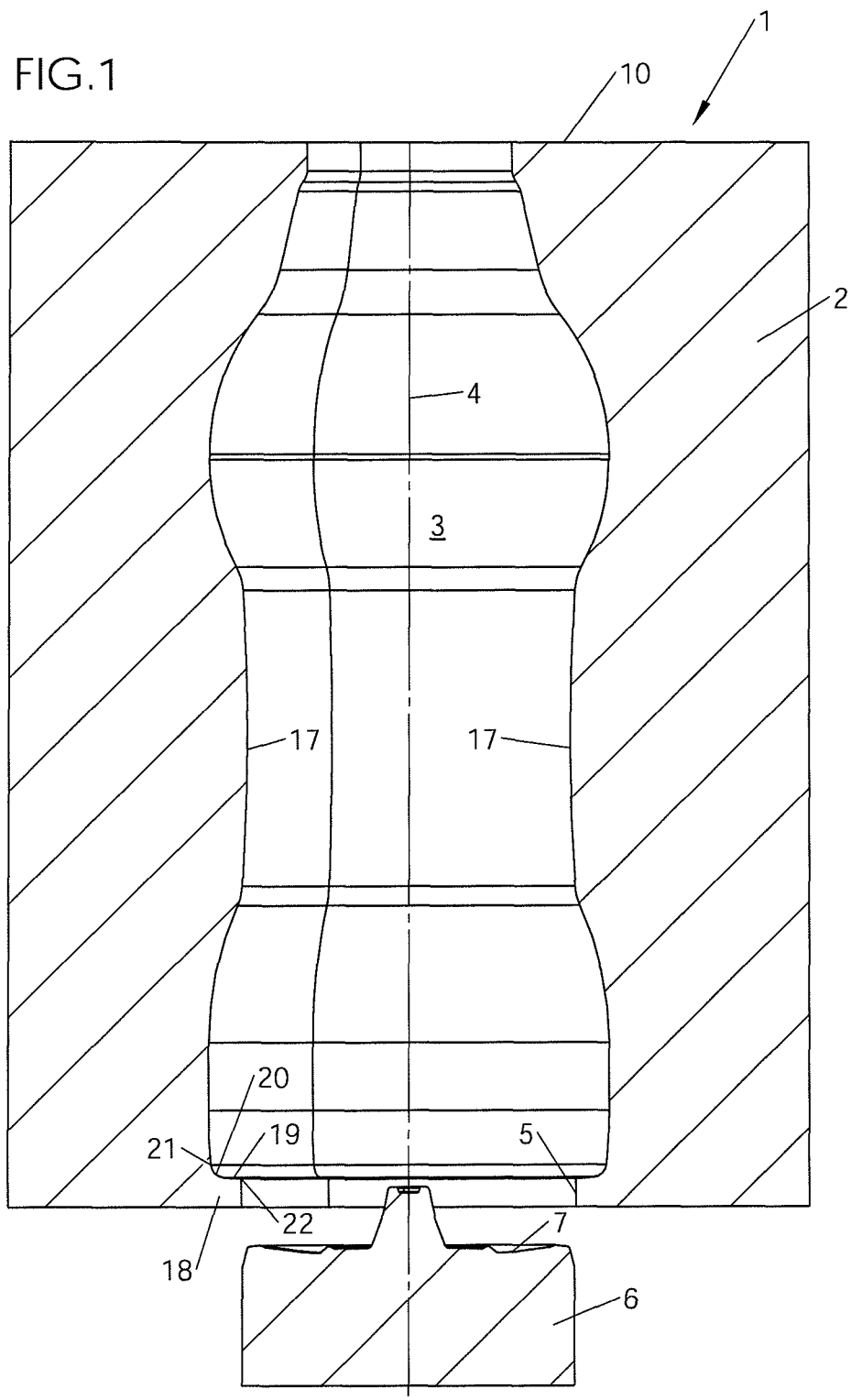
FIG. 1 is a cross-sectional view in elevation illustrating a mold according to a known embodiment, shown in the lower position of the mold bottom.

Represented in FIG. 1 is a mold 1 according to a known embodiment, for the manufacture of containers by stretch-blowing from blanks made of plastic material.

Said mold 1 comprises a wall 2 defining an internal cavity 3 around a principal axis 4 of the mold, which when the containers to be formed are symmetrical in revolution, form an axis of symmetry of the mold 1.

Figure 2:
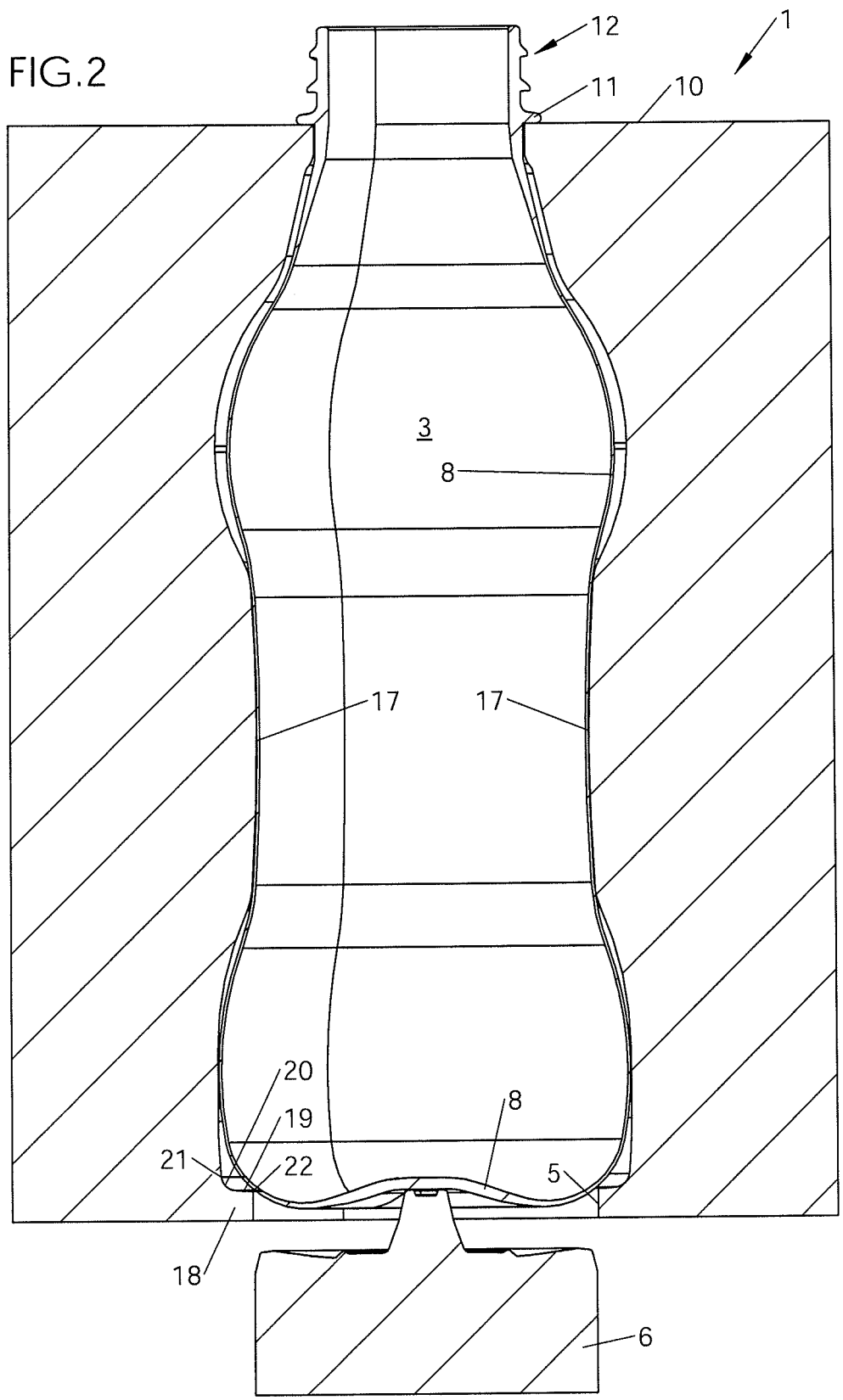
FIG. 2 is a cross-sectional view in elevation illustrating the mold of FIG. 1, shown with a container in the process of blowing, in an intermediate position of the mold bottom.
Figure 3:
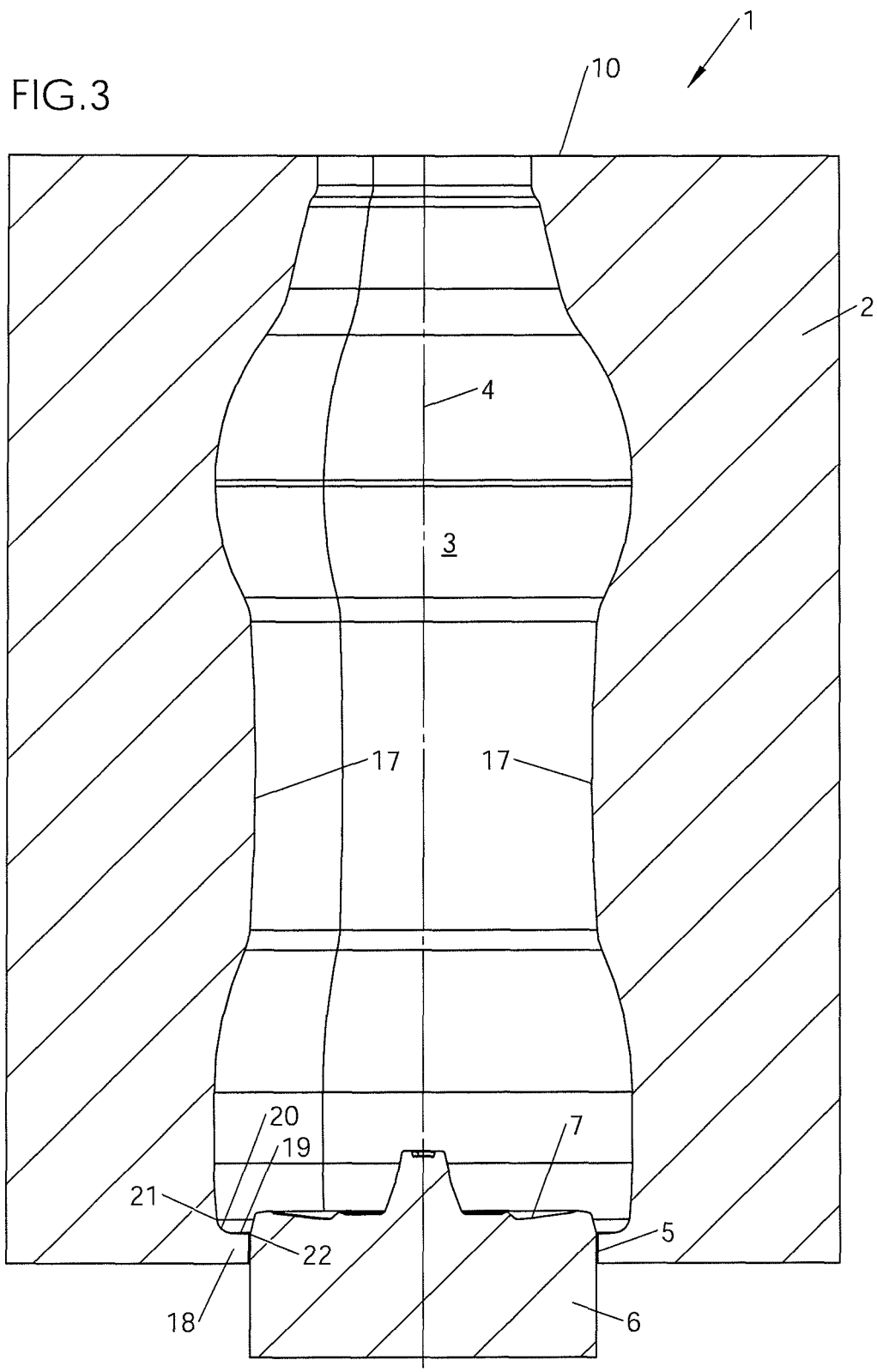
FIG. 3 is a cross-sectional elevation view illustrating the mold of FIGS. 1 and 2, in the upper (final) position of the mold bottom.

The wall 2 has, in a lower part, an opening 5 defining a passage for a mold bottom 6 mounted movably with respect to the wall 2 between a lower position, illustrated in FIGS. 1 and 2, in which the mold bottom 6 is separated downward from the opening 5, and an upper position, illustrated in FIG. 3, in which the mold bottom 6 blocks the opening 5. The mold bottom 6 has an upper surface 7 which, in the upper position of the mold 1, closes the cavity 3, thus completing the impression against which the container blank 8 is applied during blowing.

As is represented in FIG. 2, the blank 8, then the container 9 formed therefrom, rest on the upper face 10 of the mold 1 by means of a collar 11, which delimits a neck 12 of the container 9 held outside of the mold 1.

Beneath the collar 11, the container 9 has a body 13, which basically extends along the axial direction, and a bottom 14 which basically extends along the radial direction from a lower end 15 of the body 13.

At the junction between the body 13, at the lower end 15 thereof, and the bottom 14, the container 9 has a shoulder 16 having a profile of an arc of circle.

The wall 2 has a lateral surface 17 which extends basically along the axial direction, and forms the impression of the body 13 of the container 9.

As can be seen in FIGS. 1 to 3, the wall 2 has, around the opening 5, a protruding annular rim 18. Said rim 18 has an annular upper surface 19, which extends radially, substantially perpendicular to the lateral surface 17. A shoulder 20 with a profile of an arc of circle provides the junction between the lateral surface 17, at a lower end 21 thereof, and the annular surface 19.

The annular surface 19 is terminated, toward the interior (i.e. toward the axis), by an edge 22 forming a sharp edge that is the upward limit of the opening 5 of the side of the cavity 3.

The combination of this annular surface 19 with the upper surface 7 of the mold bottom 6 forms the complete impression of the bottom 14 of the container 9, while the shoulder 20 forms the impression of the shoulder 16 between the body 13 and the bottom 14 of the container 9.

To manufacture the container 9 from a blank 8 (in practice, this is generally a preform obtained by injection), the following procedure is used.

The mold 1 being in the configuration illustrated in FIG. 1, with the mold bottom 6 in its lower position, the previously heated preform is inserted therein.

The preform is stretched by means of a stretch rod while air is blown into it at a pre-blowing pressure (less than 15 bars).

As soon as the stretching is completed, i.e. when the stretch rod has reached the mold bottom 6, air at blowing pressure (more than 30 bars) is blown into the blank 8, and the mold bottom 5 [sic] is raised from its lower position illustrated in FIG. 2 to its raised position illustrated in FIG. 3, thus causing the boxing of the bottom 6.

Under the blowing pressure, the blank 8 is then completely pressed against its impression, formed by the following set of surfaces:

the lateral surface 17 of the wall 2, which forms the body 13 of the container 9;

the annular upper surface 19 of the rim 18 and the upper surface 7 of the mold bottom 6, which together form the bottom 14 of the container 9;

the shoulder 20 between the lateral surface 17 of the wall 2 and the annular upper surface 19 of the rim 18, which forms the shoulder 16 between the body 13 and the bottom 14 of the container 9.

As illustrated in FIGS. 4 and 5, the bottom 14 of the container 8 has an annular outer surface 23, which adjoins the shoulder 16 and corresponds to the counter-impression of the annular upper surface 19 of the rim 18 and is extended, toward the interior, by an arch 24.

The arch 24 is divided into three concentric regions, i.e. from the center toward the periphery:

A center pin 25 that extends into the interior of the container 8, an annular flexible membrane 26 (provided in order to bend under the effect of hot filling, then to regain its initial position when the liquid cools), which extends radially out from the pin 25, an annular step 27, which extends substantially axially at the periphery of the annular membrane 26 and connects the latter to the annular outer surface 23.

An annular surface 28 of the outer surface, located at the junction with the step 27, forms the resting point of the container 9, by which it is in contact with any support plane on which it is set down.

In the opinion of the inventors, the embodiment that has just been described, which is known and corresponds to a technique currently employed for HR applications, can be improved.

In particular, the bottom 14 has insufficient structural rigidity to allow any material savings.

The inventors have considered modifications of the structure of the mold 1, particularly in order to allow better stretching of the bottom 14 of the container 8 during its manufacture.

A description of two embodiments proposing such structural modifications follows, with reference respectively to FIGS. 6 to 11 and 12 to 17. For purposes of simplification, the common elements to both embodiments and to the known embodiment described above are referenced in an identical manner.

In the following, the dimensional characteristics, and in particular the relationships of diameters or transverse dimensions, as well as the angles are all expressed in just one plane containing the axis 4, which corresponds to the cutting plane.

EXAMPLE 1

FIGS. 6 to 11

As before, the mold 1 comprises a wall 2 defining an internal cavity 3 around the principal axis 4 of the mold 1.

Figure 8:
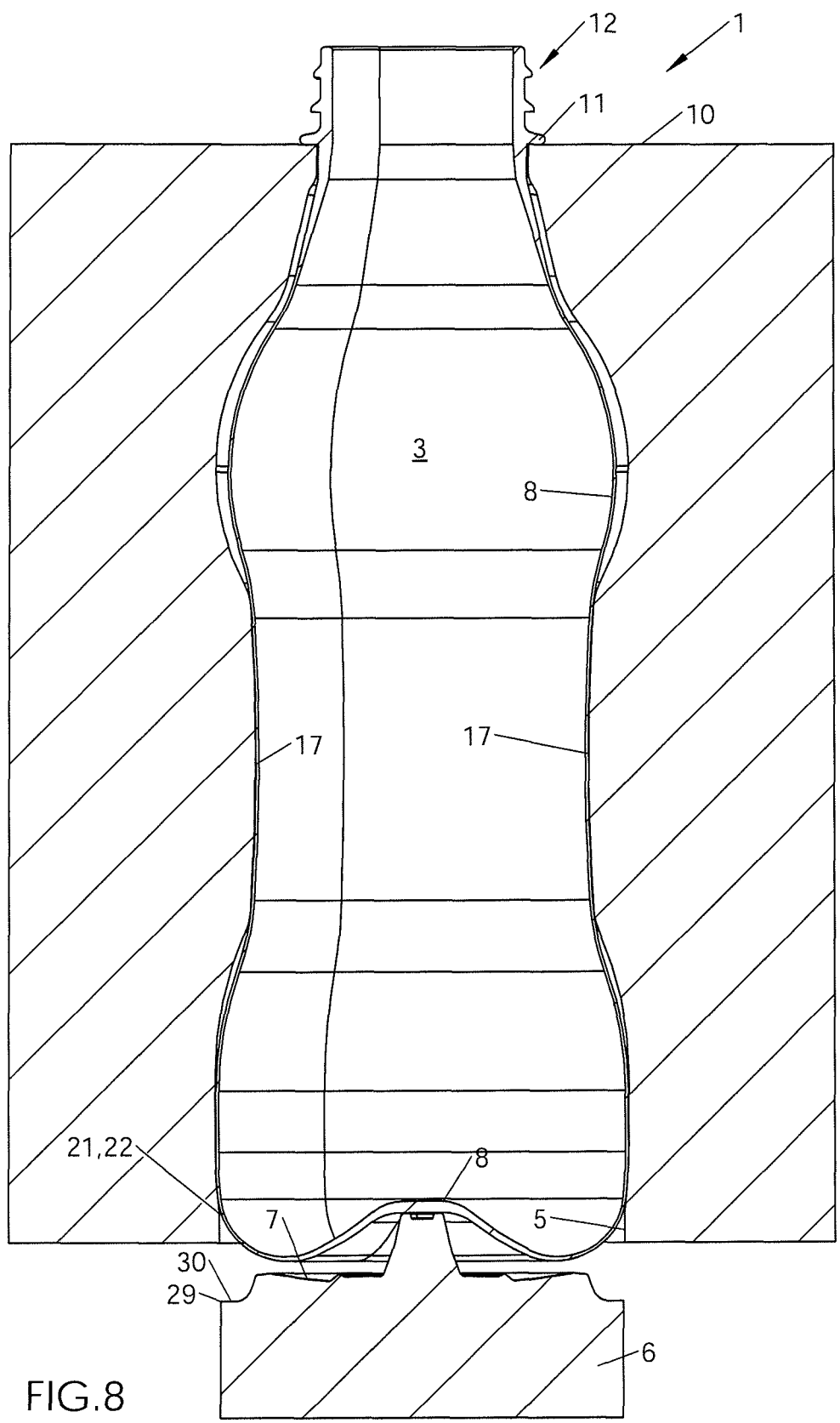
FIG. 8 is a cross-sectional view in elevation illustrating the mold of FIG. 6, shown with a container in the process of blowing, in an intermediate position of the mold bottom.
Figure 9:
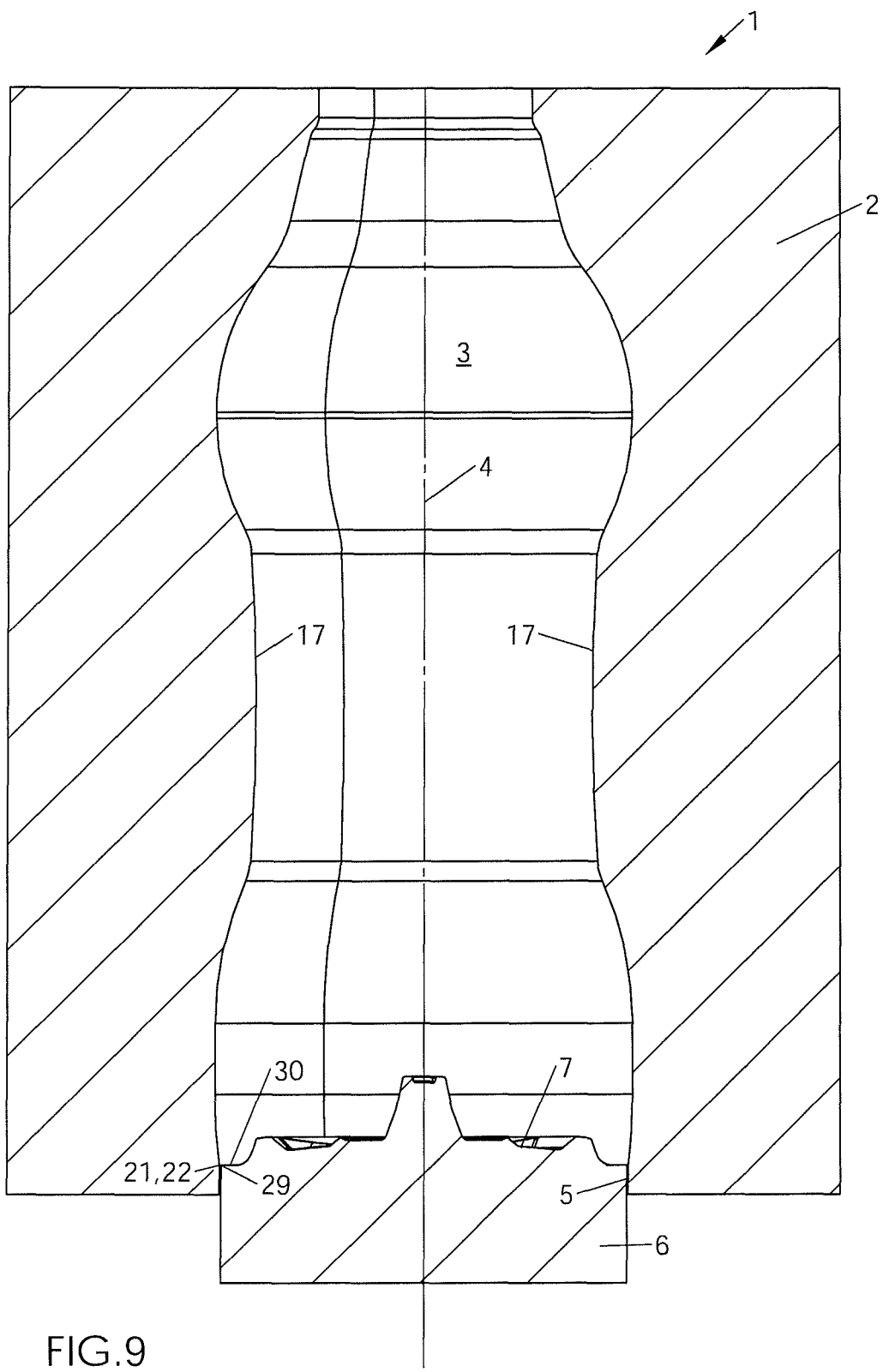
FIG. 9 is a cross-sectional view in elevation illustrating the mold of FIGS. 6 and 7, shown in the upper (final) position of the mold bottom.
Figure 10:
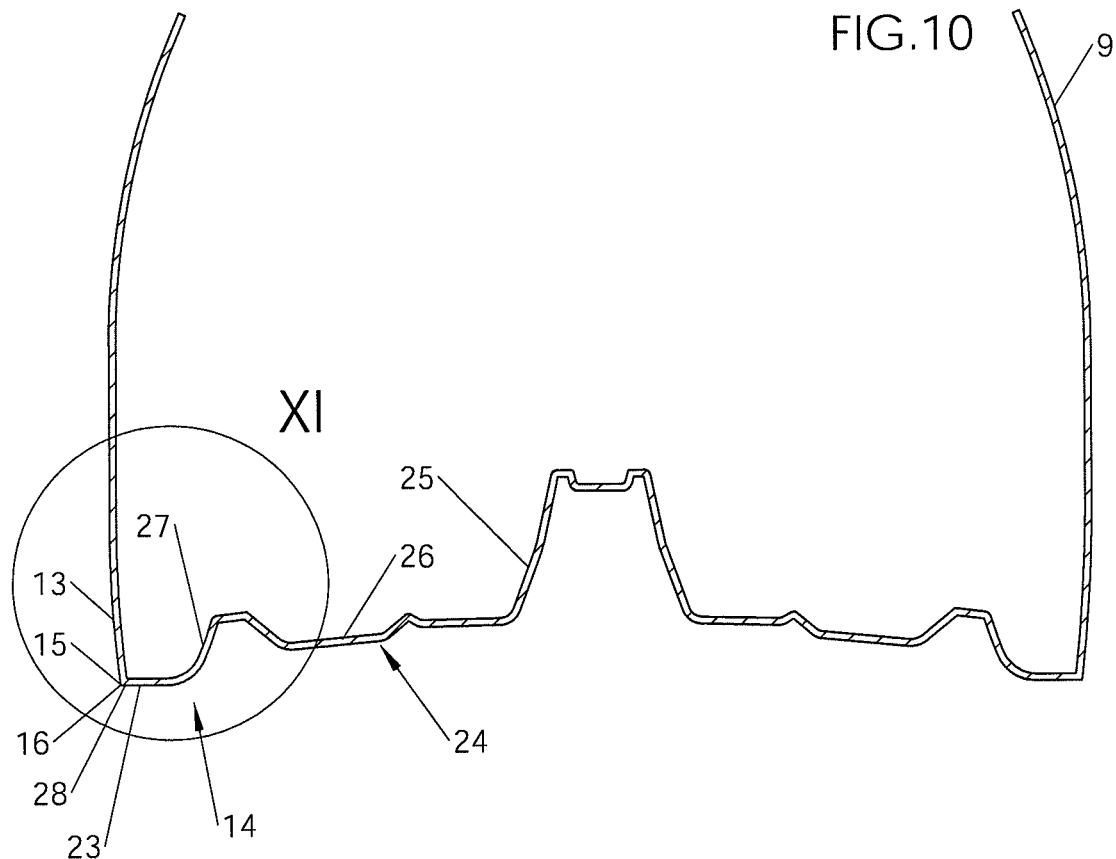
FIG. 10 is a partial cross-sectional view showing a container produced by stretch-molding in a mold as represented in FIGS. 6 to 9.
Figure 11:
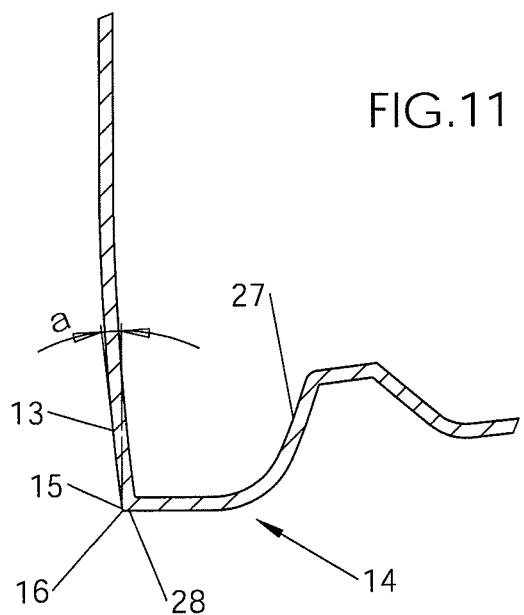
FIG. 11 is a partial cross-sectional view, in larger scale, of a detail shown in the inset XI of the container of FIG. 10.
Figure 12:
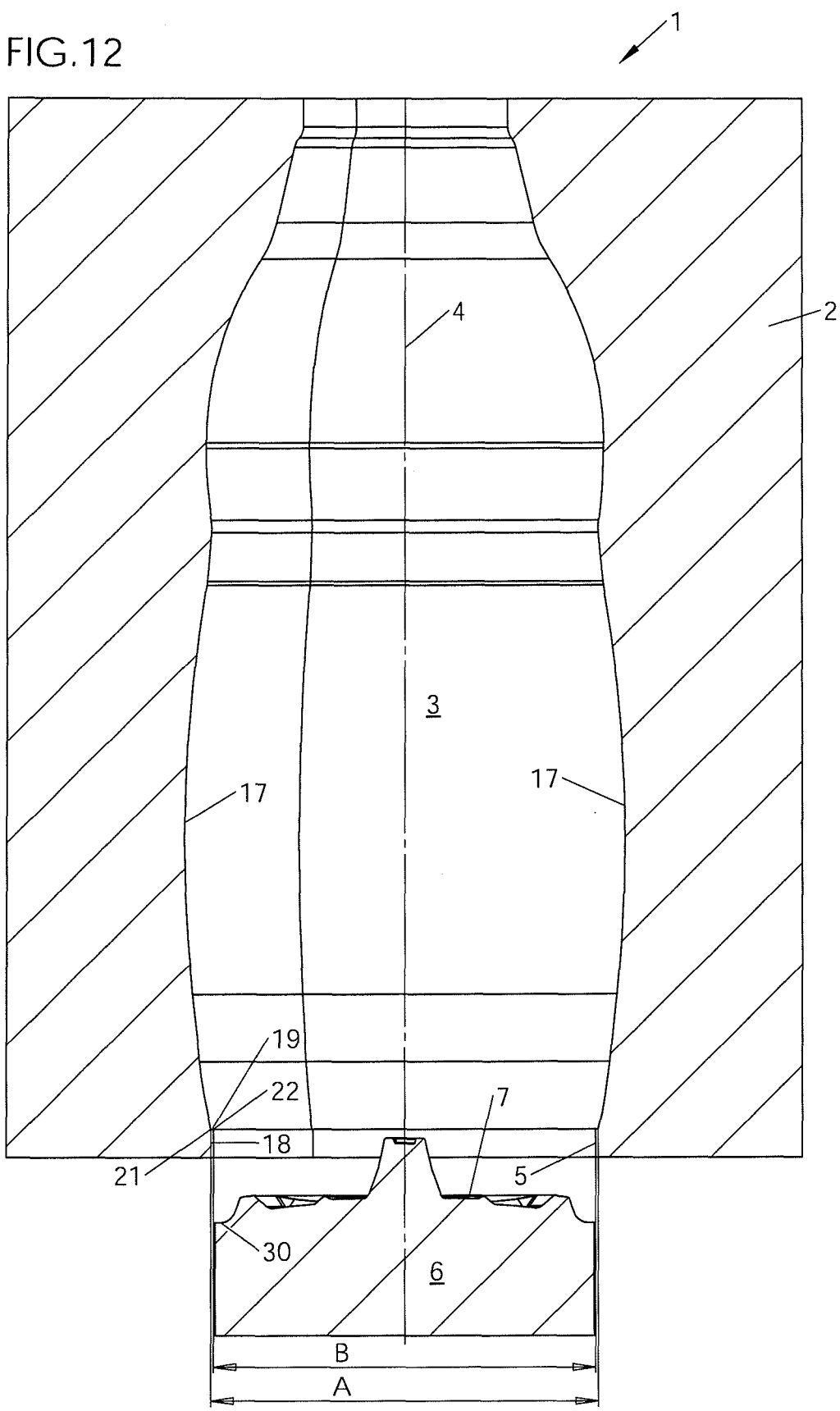
FIG. 12 is a cross-sectional view in elevation illustrating a mold according to the invention, shown in the lower position of the mold bottom, according to a second embodiment.
Figure 13:
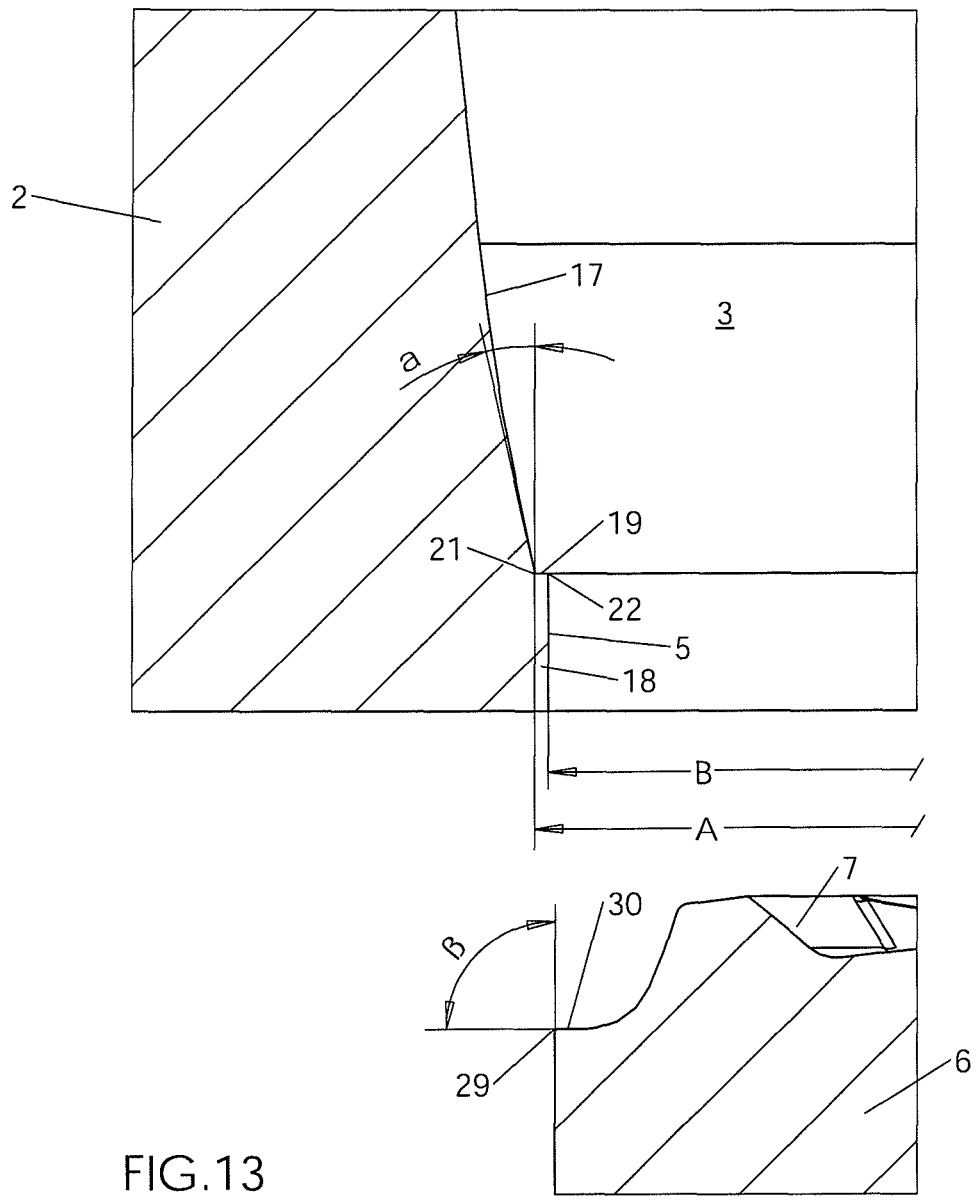
FIG. 13 is a partial cross-sectional view, in larger scale, of a detail of the mold of FIG. 12.
Figure 14:
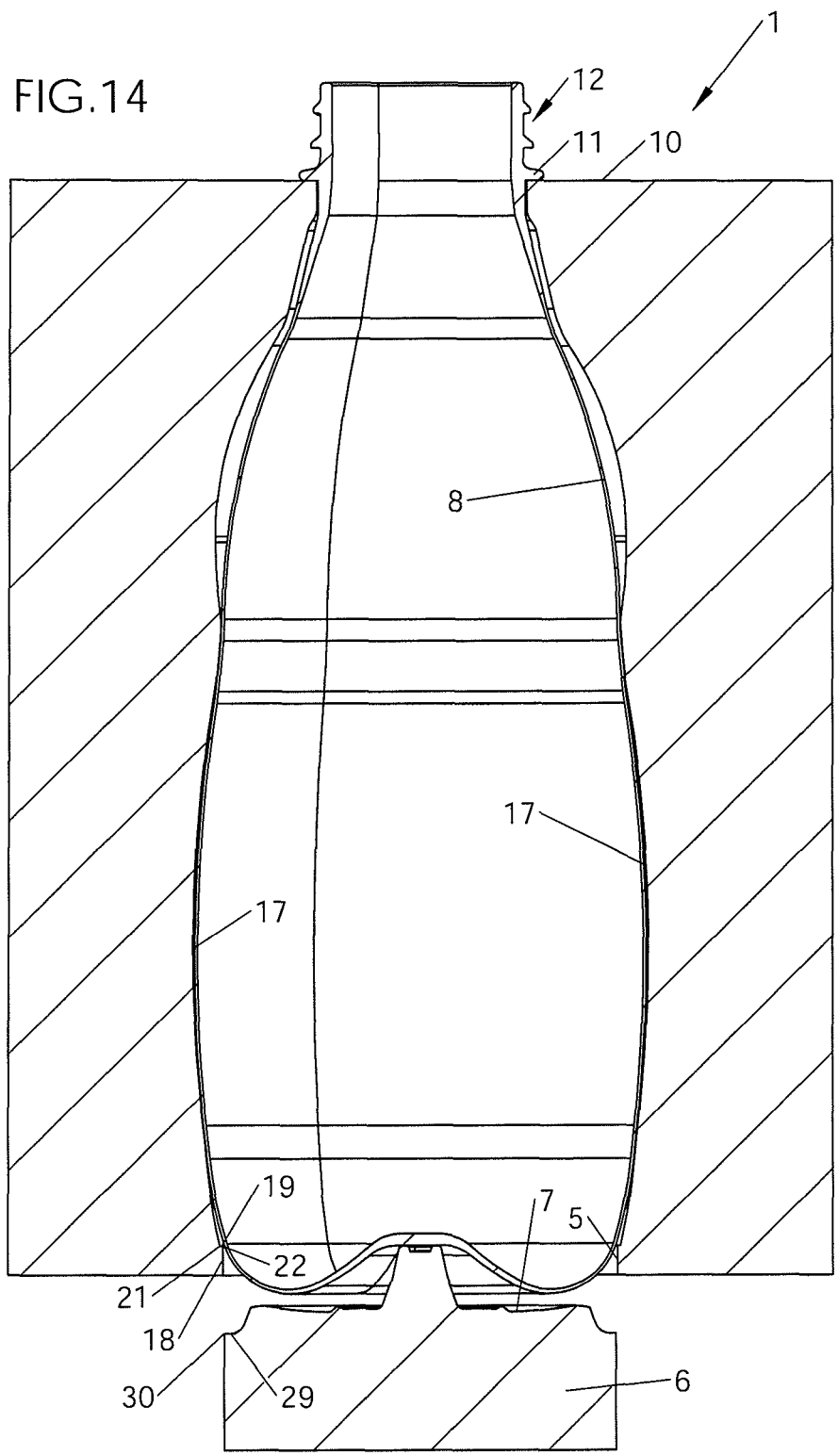
FIG. 14 is a cross-sectional view in elevation illustrating the mold of FIG. 12, shown with a container in the process of blowing, in an intermediate position of the mold bottom.
Figure 15:
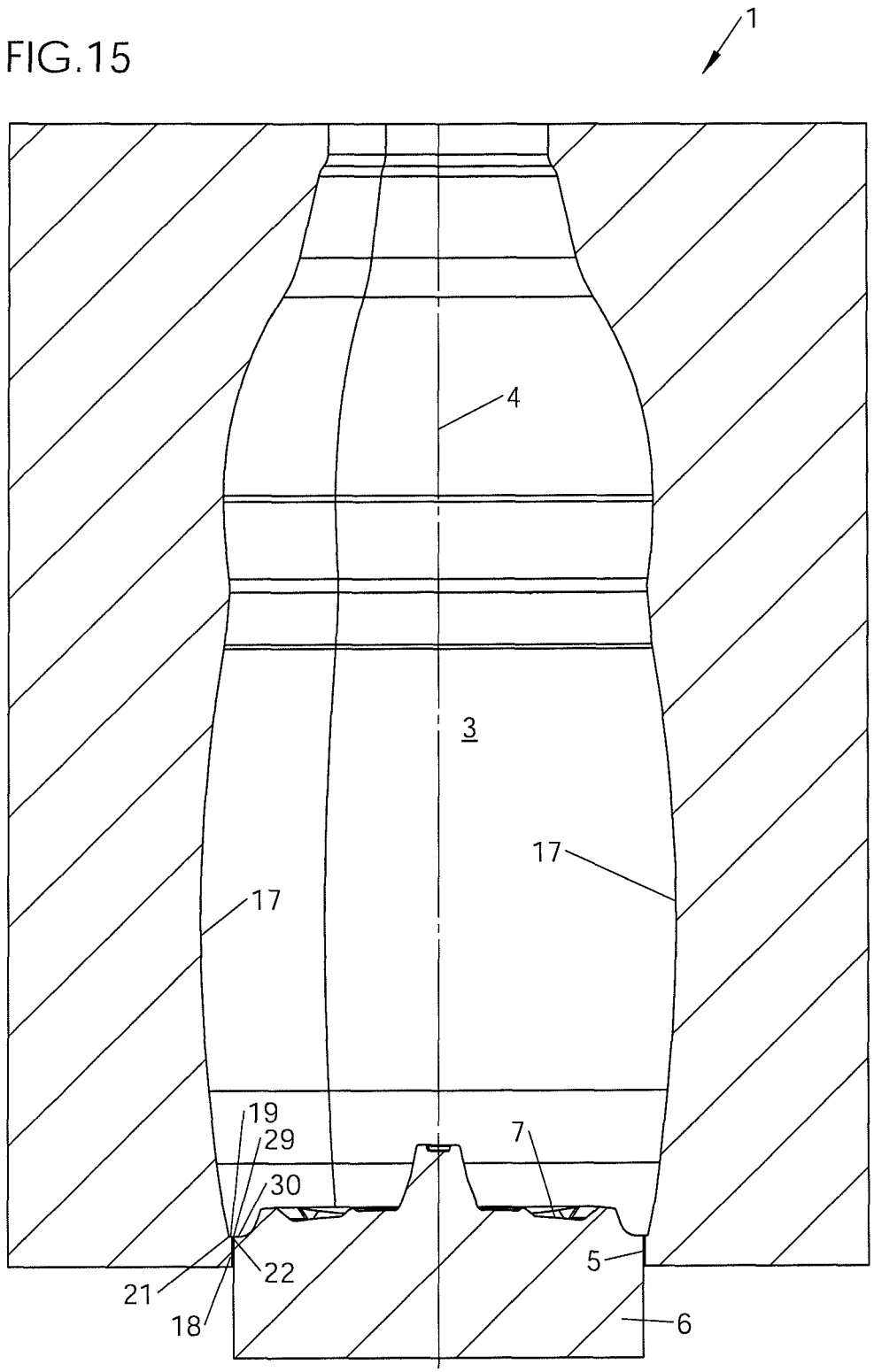
FIG. 15 is a cross-sectional view in elevation illustrating the mold of FIGS. 12 and 13, shown in the upper (final) position of the mold bottom.
Figure 16:
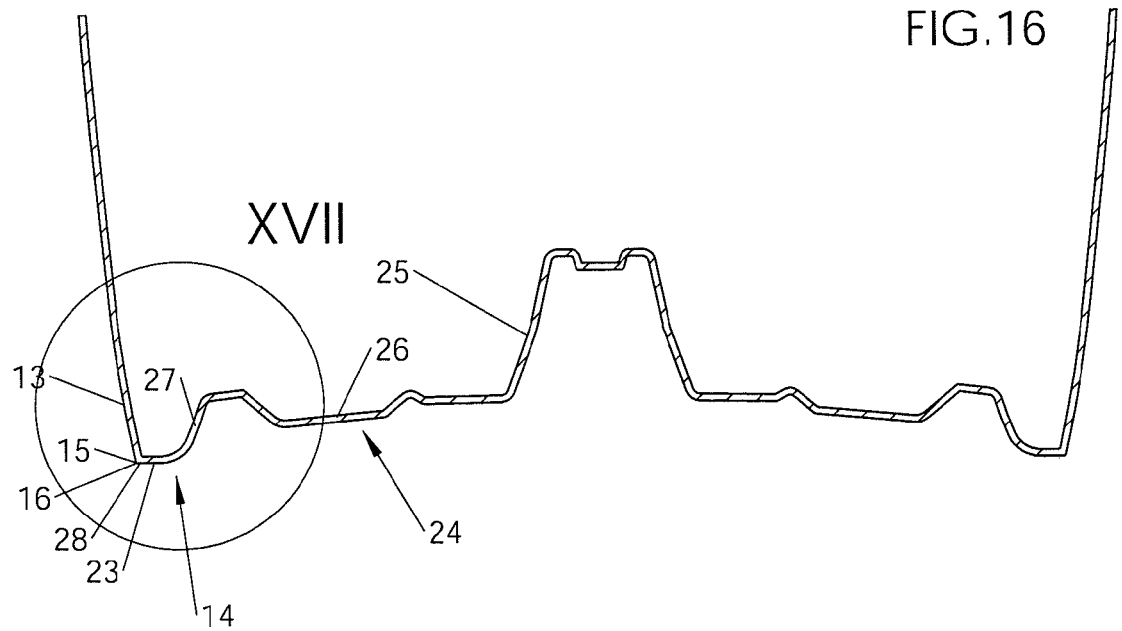
FIG. 16 is a partial cross-sectional view showing a container produced by stretch-molding in a mold as represented in FIGS. 12 to 15.
Figure 17:
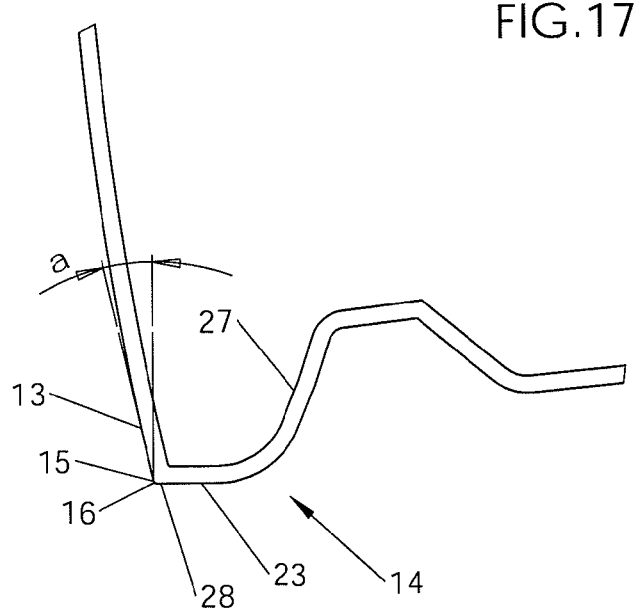
FIG. 17 is a partial cross-sectional view, in larger scale, of a detail shown in the inset XVII of the container of FIG. 16.

An opening 5 is provided in the lower part of the mold 1 to allow the passage of the mold bottom 6, mounted movably with respect to the wall 2 between its lower position, illustrated in FIGS. 6 and 8, in which the mold bottom 6 is separated downward from the opening 5, and its upper position illustrated in FIG. 9, in which the mold bottom 6 blocks the opening 5.

As before, in its upper position the mold bottom 6 closes the cavity 3 and completes the impression against which the blank 8 is applied during blowing.

However, unlike the known embodiment, the impression of the bottom 14 of the container 9 is completely formed on the mold bottom 6, and more specifically by the upper surface 7 thereof.

As can be seen in FIG. 5, and in more detail in FIG. 6, the wall 2 unlike the known embodiment does not include any annular rim in its lower part, the upper edge 22 of the opening 5 being combined with the lower end 21 of the lateral surface 17 of the wall 2 forming the impression of the body 13 of the container 9.

The relationship of the dimensions of the mold body and of the wall of the mold are in effect modified, the transverse dimension B (i.e., in the case of a cavity 3 having a symmetry of revolution, the outside diameter) of the mold bottom 6 at its upper surface 7 being substantially equal to the transverse dimension A of the lateral surface 17 of the wall 2, measured at its lower end 21.

This structural feature can be characterized on the wall 2 of the mold 1 itself, in that only a working clearance distinguishes the transverse dimension B of the upper surface 7 of the mold bottom 6, measured at its outer edge 29, from the transverse dimension (that will also be noted as B) of the wall 2, measured at the upper edge 22 of the opening 5.

Thus, in a first embodiment, the transverse dimension B of the upper edge 22 of the opening 5 is equal to the transverse dimension A of the lateral surface 17, measured at its lower end 21.

Furthermore, the lateral surface 17 of the wall is, in the vicinity of its lower end 21, substantially vertical, i.e. it extends substantially axially.

Specifically, this characteristic can be expressed by an angular prescription: the tangent to the lateral surface 17 of the wall, measured at the lower end 21 thereof, forms with the axis 4 of the wall 2 an angle α equal to or less than 30°, and preferably less than 10°. Of course, it is possible to produce a lateral surface 17 with a tangent angle α of zero (i.e., the lateral surface 17 is tubular in the vicinity of its lower end). In the illustrated example, this angle α is about 7°.

As can be seen in FIG. 6, and in more detail in FIG. 7, the upper surface 7 of the mold bottom 6 has at its periphery an annular portion 30 that extends substantially in a radial plane. Moreover, the tangent to the upper surface 7 of the mold bottom 6, at its outer edge 29, forms with the axis a right angle or substantially right angle β. Since, in the upper position of the mold bottom 6, the outer edge 29 of the mold bottom 6 is located at the lower end 21 of the lateral surface 17, it will be understood that the junction between the lateral wall 2 and the upper surface 7 of the mold bottom 6 is in the form of a clipped-off corner (ignoring the working clearance between the mold bottom 6 and the opening 5).

EXAMPLE 2

FIGS. 12 to 17

For obvious reasons of brevity, we will not describe again the provisions that are common to the first example (the respective numerical references being used on the figures).

This second embodiment is distinguished from the first one by the presence, in the lower part of the wall 2, around the opening 5, of a projecting annular rim 18, of low radial extension, which has an upper surface 19 extending in a transverse plane substantially perpendicular to the axis 4, and forming the impression of the resting point 28 of the container 9.

In other words, there is a slight offset, measured radially, between the lower end 21 of the lateral surface 17 of the wall 2, and the upper edge 22 of the opening 5. More precisely, the ratio between the transverse dimension B of the upper edge 22 of the opening 5 and the transverse dimension A of the lower end 21 of the lateral surface 17 is greater than 0.95. In the illustrated example, this ratio is equal to about 0.98.

The angular prescription of the first example, concerning the tangent at the lateral surface 17 at its lower end 21, is still valid. In this instance, in the illustrated example where the container 9 to be produced is more rounded in shape in its lower part, the lateral surface 17 is more open with a tangent angle α of about 13° at its lower end 21.

It should be noted that, including working clearance, the transverse dimension of the mold bottom 6, measured on the peripheral edge 29 of its upper surface 7, is equal to the transverse dimension of the upper edge 22 of the opening 5.

This embodiment makes it possible to obtain a container 9 substantially identical to that of the first example.

There are certain advantages of the configurations in the two embodiments described above, compared to the known embodiments as described earlier with reference to FIGS. 1 to 5.

Indeed, in this known embodiment the sharp edge formed by the upper edge 22 of the opening 5 risks causing the shearing of the material during blowing of the blank 8, as is illustrated in FIG. 2. To avoid such shearing, it is customary to raise the mold bottom relatively soon, with the result that the stretching of the bottom 6 of the container 9 is limited.

On the contrary, in the embodiments described with reference to FIGS. 6 to 17, the bottom 6 of the container can be stretched more than in the known molds, because the absence (for example 1) or the minimization (for example 2) of a sharp edge beneath the lower end 21 of the wall 2 results in the material not undergoing any shearing (in example 1), or very little (in example 2). The mold bottom 6 can therefore be held in its lower position for a longer time prior to its raising being called for, which increases the stretching of the material not only at the bottom 14, but also at the junction between the bottom 14 and the body 13.

The additional stretching makes it possible to better distribute the material over the whole bottom 14, and to reduce the quantity of amorphous material, particularly in the pin 25, to the benefit of the structural rigidity of the bottom 14 at the resting point.

Furthermore, in the container 9 according to the known embodiment, the radius of the shoulder 16 between the body 13 and the bottom 14 is relatively large with regard to the transverse half-dimension (i.e. the radius) of the bottom 14, in a ratio of more than about 1/10 (for example, for a container made of PET with a capacity of 0.5 L, the bottom 6 of which has a radius of 30 mm, the radius of the shoulder 16 is generally more than 5 mm). This dimensional characteristic is the result of manufacturing constraints, the deformation that the material undergoes due to its viscosity (related to the heating temperature), its thickness (related to the amount of stretching), and the blowing pressure not allowing the radius of the shoulder 16 to be decreased without producing incipient fractures due to local excess stresses.

On the contrary, in the two embodiments, the increased stretching of the material and the subsequent decrease of its thickness make it possible to increase its deformability and to produce a shoulder 16 whose radius is small compared to the half-dimension (i.e. the radius) of the bottom 14, in a ratio of less than about 1/50. Thus, for a container produced from PET, with a capacity of 0.5 L and the bottom 14 of which has a radius of 30 mm, with the same heating and pressure profile, the radius of the shoulder 16 can be less than 1 mm, for example in the vicinity of 0.5 mm.

The junction, in the mold 1, between the lateral surface 17 and the upper surface 7 of the bottom 6 (in example 1) or the upper surface 19 of the annular rim 18 (in example 2), in the form of a clipped off corner, makes it possible to produce such a shoulder.

All in all, the bottom 14 of the container 9 has a resting point 28 extended as much as possible toward the periphery of the bottom 14, with a shoulder 16 with the body 13 having a small radius, as was explained above. The junction between the bottom 14 and the body 13 of the container thus appears more "square" than in known embodiments, to the benefit of the stability of the container 9.

The invention claimed is:

1. A mold for manufacturing, by blowing blanks made of plastic material, containers having a body and a bottom, said mold comprising a wall defining a cavity around a principal axis of the mold and comprising a lateral surface configured to give the body of the container a shape, said wall having, in a lower part, an opening defining a passage for a mold bottom, an upper surface of which is configured to confer at least in part a shape to the bottom of the container, the opening having an upper edge, said mold further comprising the mold bottom having the upper surface forming an impression of a container bottom and being mounted movably with respect to the wall between the lower position in which the mold bottom is separated from the opening, and an upper position in which the mold bottom blocks the opening;

wherein in any plane containing the axis of the wall:
the ratio between a transverse dimension of the upper edge of the opening and a transverse dimension of a lower end of the lateral surface of the wall is greater than 0.95,
the tangent to the lateral surface of the wall, at the lower end thereof, forms with the axis of the wall an angle equal to or less than 30°,
the tangent to the upper surface of the mold bottom, at its outer edge, forms with a displacement axis of the mold bottom a right angle or substantially right angle; and
wherein the wall has, around the opening, an annular rim having a radial upper surface, and in which the wall has no shoulder at the junction between the lateral surface and the radial upper surface.

2. The mold according to claim 1, wherein the tangent to the lateral surface of the wall, at the lower end thereof, forms with the axis of the wall an angle equal to or less than 10°.

3. The mold according claim 1, wherein the ratio between a transverse dimension of the upper edge of the opening and a transverse dimension of the lower end of the lateral surface of the wall is greater than 1.

4. The mold according to claim 1, wherein a transverse dimension, measured at the edge of the upper surface of the mold bottom, is equal, within working clearance, to the transverse dimension of the upper edge of the opening.

5. A method of molding a container comprising providing the mold of claim 1 and stretch-molding a container in the mold.

6. A container of plastic material comprising a body and a bottom having a predetermined transverse dimension, and having a shoulder at a junction between the body and the bottom, the ratio of the radius of the shoulder and the transverse half-dimension of the bottom is less than about 1/50.

7. The container according to claim 6, wherein the radius of the shoulder is less than 1 mm.

8. The container according to claim 7, wherein the radius of the shoulder is equal to about 0.5 mm.

9. The mold according to claim 1, wherein the upper surface of the mold bottom has along a periphery a portion that extends substantially in a radial plane.

\* \* \* \* \*